Jan. 12, 1926.  
A. J. MARCELIN  
DIRECTION FINDER  
Filed May 28, 1923
1,569,291
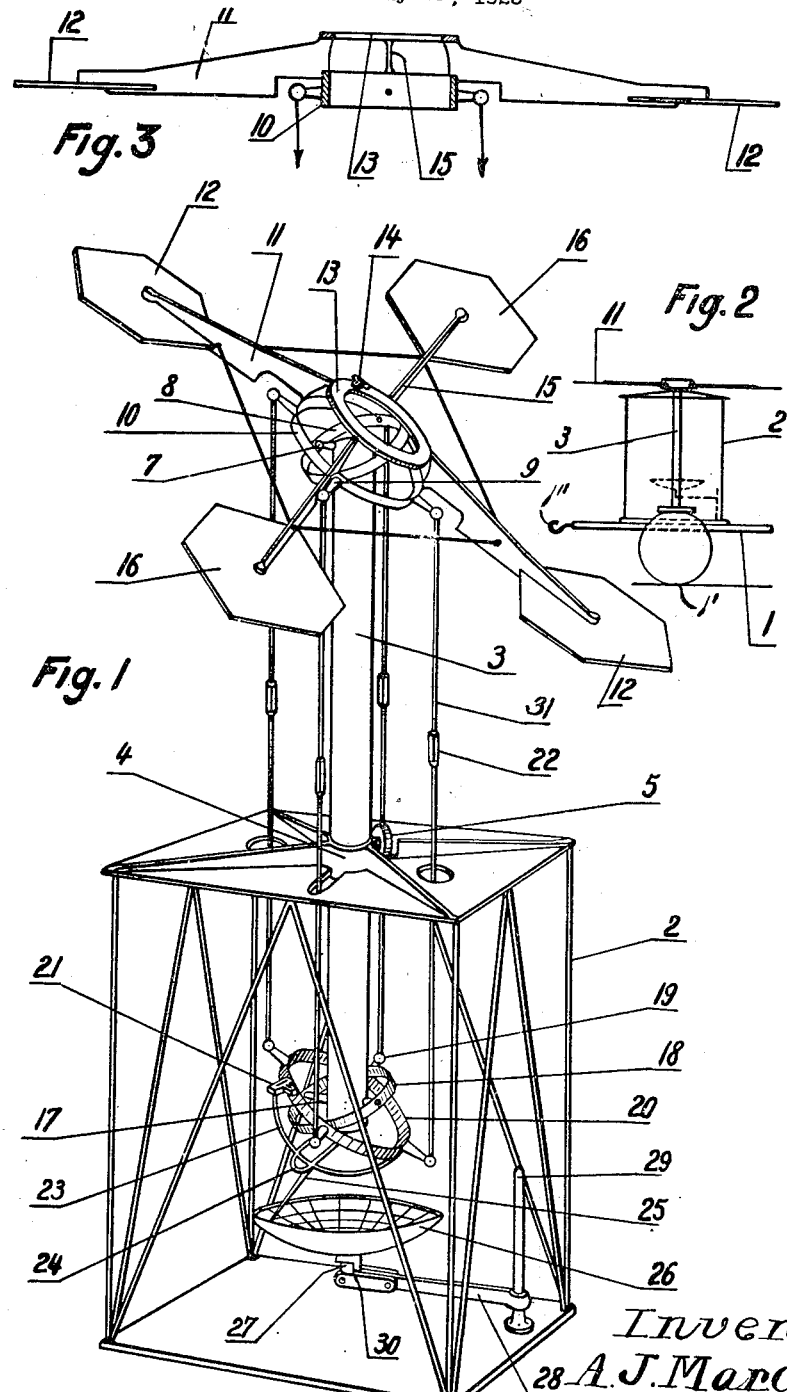

Patented Jan. 12, 1926.

1,569,291

UNITED STATES PATENT OFFICE.

ANDRÉ JULES MARCELIN, OF PARIS, FRANCE.

DIRECTION FINDER.

Application filed May 28, 1923. Serial No. 642,098.

*To all whom it may concern:*

Be it known that I, ANDRÉ JULES MARCELIN, a citizen of the French Republic, residing at 6 rue des Wallons, Paris, France, have invented certain new and useful Improvements in Direction Finders, of which the following is a specification.

It is recognized that the telesitemeter, which was devised by Mr. Jean Perrin, is a listening apparatus chiefly intended to ascertain the position of an aircraft by sound in order to direct upon it either cannon firing or searchlight projectors.

The telesitemeter is essentially characterized by two arms crossed at right angles and having at each of the four ends a receiving apparatus; one arm is adapted to pivot on a horizontal axis determining a plane in which the aircraft is comprised and thus giving the angle of elevation of the aircraft, whilst the second arm pivots on an axis which is constantly perpendicular to the first named plane and determines in this plane the direction of the aircraft and is called "axis of sweep." The receiving apparatus is preferably of the myriaphone type. This device, which forms the subject matter of French patent No. 509,877 is composed substantially of a certain number of cells or elementary horns connected together by pipes of equal length at the base of a central collector, so as to form a battery, the collectors of several of these batteries being in turn connected by tubes of equal length to a secondary collector, and so on. Two operators are stationed at the lower part of the apparatus, and each operator has his ears connected with one pair of apparatus mounted at the end of the said arms, respectively, and has within reach a control device for changing the direction of the set of receivers, in one case for elevation and in the other case for "sweep" these two controls being independent of each other.

The telesitemeters of the known types are heavy and somewhat bulky apparatus and are hence very difficult to transport.

My invention relates to an apparatus of this character which offers the following advantages:

1. It occupies but a small space, so that it can be transported upon a trailer vehicle and can be designed as a veritable field apparatus.

2. The two observers occupied with the listening are stationed within a cabin which is mounted upon a trailer and contains the lower portion of the apparatus.

3. The apparatus can be taken apart and set up in a rapid and easy manner, and is regulated with facility.

4. It is completed by a course indicator consisting essentially of a needle which remains constantly parallel with the straight line connecting the centre of the sound receiver with the determined position of the aircraft, and is enabled to follow upon a hemispherical concave element a path corresponding to the path of the aircraft in flight.

The appended drawings show by way of example an embodiment of the invention.

Fig. 1 is a general perspective view.

Fig. 2 is a general view on a smaller scale showing the apparatus arranged for road travel.

Fig. 3 is a section on the axis of one of the arms carrying the listening devices.

Upon the flooring 1 of a trailer provided with wheels 1' and coupling hook 1" is mounted a cabin 2 composed for example of a metallic frame covered with laminated wood. The said cabin serves to protect the operators engaged with the listening against outside noises, and this is important as concerns exact observations of the acoustic positions. A hollow vertical tube or column 3 enters the said cabin and is slidable in a sleeve 4 disposed upon the roof of the cabin, the tube being held by means of the set screw 5. At the top of said tube is a horizontal axle 7 having pivoted thereto a small gimbal ring which is in turn provided with an axle 9 perpendicular to the preceding and having pivoted thereto the large gimbal ring 10; to the latter is secured an arm 11 having at each end an acoustic receiver 12, for example a myriaphone. In order that the plane of the said arm shall not be subject to distortion, it is made relatively wide and is attached not only to the large ring 10 but also to a second ring 13 parallel with the latter and provided with a spirit level 14. To the ring 10 is also secured a second arm 15 perpendicular to the former and having at each end a receiver 16.

The lower end of the tube 3 situated within the said cabin is also provided with a horizontal axle 17 parallel with the axle 7 and having pivoted thereto the small gimbal ring 18 which carries the axle 19 which is perpendicular to the preceding and parallel with the axle 9 and has pivoted thereto the large gimbal ring 20 carrying the spirit level 21. The two large gimbal rings 10 and 20 are connected together by a plurality of jointed rods 31, which may be for instance four in number. The length of said rods can be adjusted by the trunbuckles 22.

The centre of gravity of the receivers and of their frame coincides with the centre of the gimbal rings, Fig. 3, thus obtaining the well-known condition of a sensitive balancing and securing a very exact working of the apparatus. For transportation purposes, it is simply necessary to loosen the screw 5 and to slide the tube 3 into the interior of the apparatus, Fig. 2, whereby the height of the whole can be much reduced and it is enabled to pass under all bridges. Each acoustic receiver is attached by a single bolt, after the manner of removable vehicle wheels. The acoustic tubes are joined by conical couplings.

The said apparatus is regulated in the following manner:

The large gimbal rings are brought parallel with each other by acting upon the turnbuckles 22, while observing the said spirit levels, and this adjustment which is durable in spite of transportation, should be verified at intervals.

The course indicator is constituted as follows:

The large gimbal ring 20 carries two large rings perpendicular to each other 23, 24 which support an indicating pointer 25 cooperating with a hemispherical concave element having a vertical axis and provided with a graduation corresponding to that of the searchlight or the cannon, for example azimuth and elevation, the said element being mounted for example upon a vertical rod 27 pivoted to the end of a vertical axle 29. A spirit level 30 is mounted on the said element.

For transporting the apparatus, the concave element 26 is turned on the axle 29 and if necessary on a second vertical axle, so as to leave the space below the column 3 entirely free, and the latter can then be lowered to the maximum. But when the apparatus is to be used, the said element is brought below the said pointer, and the axle of the element 27 is adjusted to the vertical by the use of the spirit level 30, irrespectively of the position of the remainder of the apparatus. The concave element is so disposed that when the large gimbal rings 10 and 20 are horizontal the pointer will be at zero, or at the centre of the element. It is to be observed that when the apparatus is thus adjusted it will give exact indications even if the column 3 should not be vertical.

The said pointer will remain constantly parallel with the line connecting the centre of the acoustic receivers with the position of the aircraft as ascertained by the listening. Obviously, since a certain time is required for the sound to travel from the aircraft to the listening apparatus, the position of the aircraft as determined will be in the rear of the actual position.

One may devise a great number of means utilizing the orientation of the said pointer either for simply indicating the position of the aircraft or for marking its course upon a hemispherical concave element or even upon a plane surface.

The said apparatus is of a substantial construction and is easy to regulate, and it can be employed with great facility. It constitutes a field apparatus which is especially intended for use in connection with the searchlights and automobile cannon of the anti-aircraft service.

What I claim is:

1. A telesitemeter of the field type, which is transportable upon a trailer comprising a hollow column, an horizontal axle at upper part of said column, a gimbal ring pivoting round said axle, a second axle borne by said ring and perpendicular to said horizontal axle, a second larger gimbal ring pivoting round said second axle, two arms crossed at right angles fixed on the larger ring, an acoustic receiver at both ends of each of said arms; two like gimbal rings at the lower end of the said column, the axles of which being parallel with the preceding axles and jointed rods connecting together the larger gimbal rings of the upper and lower pair.

2. A telesitemeter of the field type, which is transportable upon a trailer, comprising a hollow column, an horizontal axle at upper part of said column, a gimbal ring pivoting round said axle, a second axle borne by said ring and perpendicular to said horizontal axle, a second larger gimbal ring pivoting round said second axle, two arms crossed at right angles fixed on the larger ring, an acoustic receiver at both ends of each of said arms; two like gimbal rings at the lower end of the said column, the axles of which being parallel with the preceding axles, jointed rods connecting together the larger gimbal rings of the upper and lower pair and a cabin enclosing the lower part of the column.

3. A telesitemeter of the field type, which is transportable upon a trailer, comprising a hollow column, an horizontal axle at upper part of said column, a gimbal ring pivoting round said axle, a second axle borne by said ring and perpendicular to said horizontal axle, a second larger gimbal ring pivoting round said second axle, two arms crossed at right angles fixed on the larger ring, an acoustic receiver at both ends of each of said arms; two like gimbal rings at the lower end of said column, the axles of which being parallel with the preceding axles, jointed rods connecting together the larger gimbal rings of the upper and lower pair, a cabin enclosing the lower part of the column, and means whereby the column may descend into the interior of the cabin during the transportation.

4. A telesitemeter of the field type, which is transportable upon a trailer, comprising a hollow column, an horizontal axle at upper part of said column, a gimbal ring pivoting round said axle, a second axle borne by said ring and perpendicular to said horizontal axle, a second larger gimbal ring pivoting round said second axle, two arms crossed at right angles fixed on the larger ring, an acoustic receiver at both ends of each of said arms, two like gimbal rings at the lower end of said column, the axles of which being parallel with the preceding axles, jointed rods connecting together the larger gimbal rings of the upper and lower pair, a pointer mounted upon the larger gimbal ring of the lower set and adapted to remain constantly parallel with the straight line connecting the centre of the upper gimbal rings with the aircraft, and a spherical concave shell arranged below said pointer, and graduations in sites and in azimuths on the internal surface of the shell.

5. A telesitemeter of the field type, which is transportable upon a trailer, comprising a hollow column, an horizontal axle at upper part of said column, a gimbal ring pivoting round said axle, a second axle, borne by said ring and perpendicular to said horizontal axle, a second larger gimbal ring pivoting round said second axle, two arms crossed at right angles fixed on the larger ring, an acoustic receiver at both ends of each of said arms, two like gimbal rings at the lower end of said column, the axles of which being parallel with the preceding axles, jointed rods connecting together the larger gimbal rings of the upper and lower pair, a pointer mounted upon the larger gimbal ring of the lower set and adapted to remain constantly parallel with the straight line connecting the centre of the upper gimbal rings with the aircraft, a spherical concave shell arranged below said pointer, and graduations in sites and in azimuths on the internal surface of the shell, and means whereby said concave shell may be displaced laterally.

In witness whereof I have hereunto set my hand.

ANDRÉ JULES MARCELIN.